United States Patent
Kumura (10) Patent No.: US 7,120,192 B2
(45) Date of Patent: Oct. 10, 2006

(54) SPECTRUM SPREAD COMMUNICATION SYNCHRONIZATION ESTABLISHING APPARATUS USING FREQUENCY OFFSET AND RECEIVER WITH THE SAME

(75) Inventor: Takahiro Kumura, Tokyo (JP)

(73) Assignee: NEC Corporation, Tokyo (JP)

( * ) Notice: Subject to any disclaimer, the term of this patent is extended or adjusted under 35 U.S.C. 154(b) by 866 days.

(21) Appl. No.: 09/779,566

(22) Filed: Feb. 9, 2001

(65) Prior Publication Data

US 2001/0014115 A1    Aug. 16, 2001

(30) Foreign Application Priority Data

Feb. 16, 2000   (JP)   ............... 2000-038333

(51) Int. Cl.
*H04B 1/69*    (2006.01)
*H04B 1/713*    (2006.01)

(52) U.S. Cl. ............... 375/148; 375/149; 375/150; 375/278; 375/284

(58) Field of Classification Search ............ 375/130, 375/136, 144, 146–148, 150, 152, 316, 1, 375/278, 284
See application file for complete search history.

(56) References Cited

U.S. PATENT DOCUMENTS

| | | | |
|---|---|---|---|
| 5,361,276 A * | 11/1994 | Subramanian | 375/150 |
| 5,432,521 A | 7/1995 | Siwiak et al. | |
| 5,490,165 A * | 2/1996 | Blakeney et al. | 370/335 |
| 5,579,338 A | 11/1996 | Kojima | 375/208 |
| 5,978,411 A | 11/1999 | Kitade et al. | |
| 6,005,889 A | 12/1999 | Chung et al. | 375/208 |
| 6,094,449 A * | 7/2000 | Komatsu | 375/136 |
| 6,219,391 B1 * | 4/2001 | Nakano | 375/346 |
| 6,353,642 B1 * | 3/2002 | Asahara et al. | 375/344 |
| 6,373,882 B1 * | 4/2002 | Atarius et al. | 375/148 |
| 6,628,700 B1 * | 9/2003 | Miura | 375/148 |

FOREIGN PATENT DOCUMENTS

| | | |
|---|---|---|
| CN | 1164151 A | 11/1997 |
| CN | 1175171 A | 3/1998 |
| FR | 2 668 671 A | 4/1992 |
| JP | 2672769 | 7/1997 |
| JP | 2698506 | 9/1997 |
| JP | 2850959 | 11/1998 |
| JP | 11-88229 | 3/1999 |
| JP | 11-313382 | 11/1999 |
| KR | 97-700400 | 7/1995 |
| WO | 95-19666 | 7/1995 |

* cited by examiner

*Primary Examiner*—Jean B. Corrielus
*Assistant Examiner*—Qutub Ghulamali
(74) *Attorney, Agent, or Firm*—Foley & Lardner LLP (57) ABSTRACT

A synchronization establishing apparatus in a spectrum spread communication system, includes a search section that calculates correlation values from a received spectrum spread signal, and calculates power values and power addition values of the power values. Also, the search section selects larger ones of the power addition values to output together with timing data corresponding to the selected larger power addition values. One of the symbols and the power values is corrected in phase based on phase change quantities. A frequency offset estimating section estimates frequency offsets from one of the correlation values and the power values and demodulation timing data and calculates the phase change quantities from the estimated frequency offsets. A demodulation path selecting section selects path timings based on the selected larger power addition values and outputs the demodulation timing data to the frequency offset estimating section.

16 Claims, 4 Drawing Sheets

SPECTRUM SPREAD COMMUNICATION SYNCHRONIZATION ESTABLISHING APPARATUS USING FREQUENCY OFFSET AND RECEIVER WITH THE SAME

BACKGROUND OF THE INVENTION

1. Field of the Invention

The present invention relates to a spectrum spread communication synchronization establishing apparatus for a receiving section of a radio apparatus for a spectrum spread communication.

2. Description of the Related Art

A receiver of a direct spectrum spread system basically receives a spectrum spread signal by an antenna to convert to an intermediate frequency signal or baseband signal. Then, the receiver establishes synchronization with a spreading code signal used in a transmitter by the synchronization establishing circuit and sends the synchronized spectrum spread signal to a despreading demodulator. The despreading demodulator carries out inverse modulation. That is, the despreading demodulator multiplies the synchronized spectrum spread signal by the spreading code. A data demodulator demodulates the multiplication result to produce a data.

The synchronization establishing circuit of the receiver needs to carry out a searching operation of a phase coincident point with the spreading code and to restrict a timing in a predetermined range for establishing and tracking synchronization.

Figure 1:
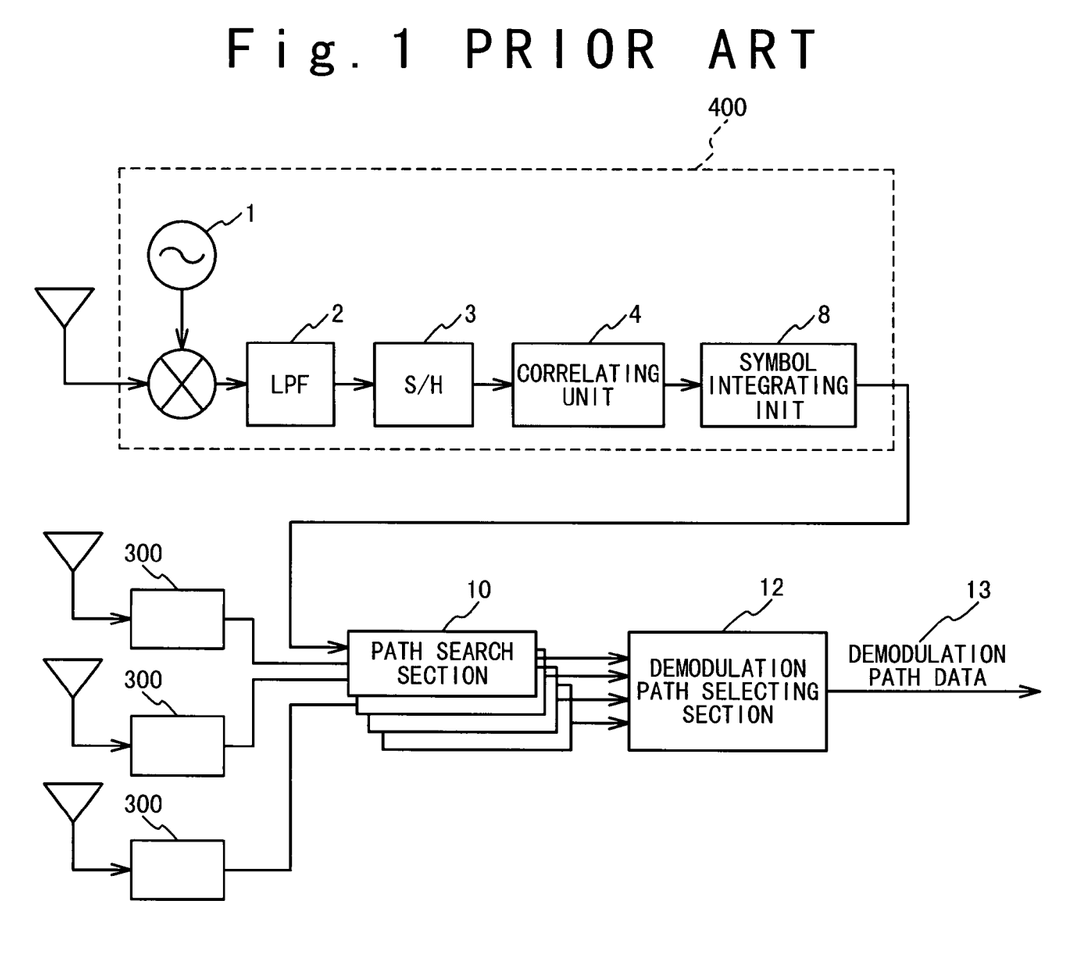
FIG. 1 is a block diagram shows the structure of a conventional spectrum spread communication synchronization establishing circuit.

FIG. 1 shows a conventional spectrum spread communication synchronization establishing apparatus. Referring to FIG. 1, the conventional spectrum spread communication synchronization establishing apparatus is composed of a plurality of synchronizing circuits 400. Each of the synchronizing circuits 400 is composed of a local oscillator 1, a multiplier, a low pass filter (LPF) 2, a sampling and holding circuit (S/H) 3, a correlating unit 4, and a symbol integrating unit 8. A signal converting section is composed of the local oscillator 1, the multiplier, and the low pass filter (LPF) 2 and converts a received signal from a corresponding antennal into a baseband signal. The sampling and holding circuit (S/H) 3 samples the baseband signal to store and hold and outputs a sampling signal. The correlating unit 4 calculates correlation between the sampling signal and a spreading signal of a spreading code to produce a correlation value. The symbol integrating unit 5 multiplies the correlation value by a theoretical value of a symbol corresponding to the correlation value in case that the symbol is known or a determination value after demodulation in case that the symbol is unknown. Then, the symbol integrating unit 5 adds the multiplication results for a plurality of symbols, and calculates power of the addition result for the plurality of symbols to produce a power value.

The spectrum spread communication synchronization establishing circuit is further composed of a plurality of path search sections 10 respectively provided for the synchronizing circuits 300 and a demodulation path selecting section 12. Each of the path search sections 10 adds the power values for a plurality of slots to produce a power addition value, and selects larger ones of the power addition values in order to outputs timings corresponding to the selected power addition values. The demodulation path selecting section selects a demodulation reception timing from the timings outputted from the path search sections 10 based on the selected larger power addition values and outputs a demodulation path data.

In the spectrum spread communication synchronization establishing apparatus, a spectrum spread signal is received by the antenna, and then is converted into the baseband signal by the local oscillator 1, the multiplier and the low pass filter (LPF) 2. Subsequently, the sampling and holding circuit (S/H) 3 samples the baseband signal for every ½ chip and supplies the sampled signal to the correlating unit 4 via a memory.

The correlating unit 4 is generally composed of a matched filter. The correlating unit 4 multiplies the spreading code for one symbol of the sampled signal read out from the memory by the preset spreading code for one symbol for every chip and outputs a summation of the multiplication results as a correlation value. This operation is carried out at a plurality of sample points, i.e., a plurality of paths which are shifted by ½ chip, 1 chip, 3⁄2 chip, and so on. The respective correlation values are outputted. Therefore, the correlation values corresponding to the plurality of paths are outputted from the correlating unit 4.

In the symbol integrating unit 5, a symbol signal obtained by carrying out a despreading operation in the interval of ½ chip is inversely modulated. That is, the symbol signal is multiplied by a theoretical value for a symbol in case the symbol is known in a transmission sequence or a determination value determined after demodulation in case that the symbol is unknown. Then, the multiplication results are added for a plurality of symbols for every path so as to carry out symbol integration. It should be noted that the whole or a part of the symbol contained in a slot is used for the symbol integration. The power value of the integrated addition value is determined and outputted to the path search section 10.

The path search section 10 adds the power values for a plurality of slots to produce a power addition value. Subsequently, the path search section 10 selects larger ones of the power addition values in order to outputs the selected power addition values together with timing data. The demodulation path selecting section 12 selects some path timings based on the timing data and the selected larger power addition values outputted from the path search sections 10. The demodulation path selecting section 12 outputs the timing of the path and antenna data to a demodulating section which is connected with the demodulation path selecting section 12.

As methods for selecting the path in the demodulation path selecting section 12, there are a method for allocating demodulation paths in order of larger average power per one slot, a method for weighting the power addition value for each path in accordance with the signal to interference ratio (SIR) of the path and allocating the demodulation paths in order of larger weighted power addition values, and a method for selecting the path in consideration of past changes of the power addition values of each path. In either of the methods, any one of the paths is selected when the path timings are close to each other in case of paths obtained from the same antenna.

According to the above-mentioned conventional spectrum spread communication synchronization establishing apparatus, an appropriate synchronization timing can be established with less erroneous determination of a synchronization position. Also, even when the synchronization timing is changed, the change is able to be tracked. Thus, the receiving quality can be improved and it is not necessary to use wasteful strong transmission output on the transmission side in order to attain a predetermined receiving quality, resulting in suppression of interference.

On the other hand, in this kind of receiver, there is a frequency offset generated in the transmission path due to the Doppler effect or a frequency offset due to a frequency error between a receiver oscillator and the transmitter oscillator. If the frequency offset exists, a gain cannot be sufficiently obtained due to phase rotation caused by the frequency offset in in-phase addition of outputs from the correlating units 4 for several symbols.

In addition, when the frequency offset increases, the sufficient gain cannot be obtained, and conversely, the addition may exert detrimental effects. Consequently, the number of symbols for the in-phase addition must be decreased not to receive influence of the frequency offset.

In conjunction with the above description, a search and establishing method of a code division multiple access signal is disclosed in Japanese Laid Open Patent Application (JP-A-Heisei 11-313382). In this reference, a code division multiple access signal is received, and a spreading code signal is extracted from the received code division multiple access signal. A local spreading code signal is generated and a frequency offset is detected between the extracted spreading code signal and the local spreading code signal. Whether the received code division multiple access signal is appropriate is determined based on the frequency offset. The received code division multiple access signal is decoded when it is appropriate.

Also, a spectrum spread type receiver is disclosed in Japanese Patent No. 2672769. In this reference, a quasi-synchronization detecting circuit mixes a received spectrum spread (SS) signal which has been spectrum spread by use of a pseudo-noise (PN) signal to a local carrier orthogonal to the SS signal and gets a complex baseband signal. A partial correlation calculation section divides the complex baseband signal into a plurality of partial data and calculates correlations between these partial data and corresponding partial PN signals to produce partial correlation signals. An absolute value square summation calculating section calculates a summation of squares of absolute values of the partial correlation signals and outputs a correlation absolute value square summation signal. An initial synchronization establishing and tracking section detects a repetition period of the PN signal contained in the received SS signal based on the correlation absolute value square summation signal and output a timing signal synchronized with the repeating period.

Also, a spectrum spread type receiver is disclosed in Japanese Patent No. 2698506. In this reference, a spectrum spread type receiver receives a direct spectrum spread (SS) signal spectrum spread by a pseudo-noise (PN) signal. A quasi-synchronization detection circuit mixes a reception SS signal and a local carrier to produce a complex baseband signal. A correlating unit carries out an operation of the correlation between the complex baseband signal and the PN signal. An AFC circuit generates an error signal in accordance with a frequency offset of the local carrier to the reception SS signal and corrects the influence of the frequency offset of the local carrier in accordance with this error signal. An initial synchronization establishing and tracking circuit carries out initial synchronization establishment and tracking of the PN signal based on a result obtained by adding a signal of the magnitude of the correlation signal and a signal of the magnitude of the error signal.

Also, a spectrum spread communication synchronization establishment demodulator is disclosed in Japanese Patent No. 2850959. In this reference, a spectrum spread code synchronous circuit carries out demodulation after despreading with a spreading code, when a spectrum spread signal obtained by spectrum spread using the spreading code after modulating a transmission data and then transmitted is received as a reception signal, and demodulated so as to reproduce a reception data. A signal converting section converts the reception signal into a baseband signal. A sampling and holding circuit samples, stores and holds the baseband signal and outputs a sampling signal. A first correlating unit calculates correlation between the sampling signal and a spreading signal of the spreading code to produce a first correlation value. A symbol integrating unit inversely modulates the first correlation value based on either of a theoretical value of a symbol corresponding to the first correlation value in case of the known symbol or a determination value after demodulation in case of unknown symbol, and adds the inverse modulation result for a plurality of symbols, and calculates power of the addition result to produce a power value. A short-time integration path search section adds the power values for a plurality of slots and selects ones of the addition results in order of larger power value per a slot for the number of first correlating units. A long time integration path search section adds the power value for a plurality of slots longer in time than that of the short time integration path search section and selects ones of the addition results in order of larger power value per a slot for the number of first correlating units. A demodulation path selecting section selects demodulation reception timings from the timings from the short time integration path search section and the long time integration path search section in order of larger power value per a slot. A second correlating unit calculates correlation between the reception signal and the spreading signal at the demodulation reception timings to produce a second correlation value. A detector detects the second correlation value and outputs a detection signal. A signal synthesizing section outputs the determination value based on a synthesis signal obtained by carrying out RAKE synthesis and space diversity synthesis of the detection signal for each path.

SUMMARY OF THE INVENTION

An object of the present invention is to provide means for setting a larger number of symbols to be in-phase added than a conventional example and enabling stable synchronization establishment even in the environment where the frequency offset or noises are mixed by using a synchronization establishing circuit in the spectrum spread communication receiver which has means for compensating for the phase rotation due to the frequency offset generated in the transmission path by the Doppler effects or frequency offset for which the frequency error of the oscillator between the relevant receiver and the transmitter cannot be removed by the demodulator in a synchronization establishing circuit for carrying out the path search by the use of the values obtained by adding the outputs from the correlating unit for several symbols and integrating for a plurality of slots as in the case of the synchronization establishing circuit in the spectrum spread communication receiver as described above.

In order to achieve an aspect of the present invention, a synchronization establishing apparatus in a spectrum spread communication system, includes a search section, a frequency offset estimating section and a demodulation path selecting section. The search section calculates correlation values from a received spectrum spread signal, and calculates power values as addition values of symbols corresponding to the correlation values and power addition values of the power values. Also, the search section selects larger ones of the power addition values to output together with timing data corresponding to the selected larger power addition values. At this time, one of the symbols and the power values being corrected in phase based on frequency offsets. The frequency offset estimating section estimates the frequency offsets from one of the correlation values and the power values and demodulation timing data to output to the search section. The demodulation path selecting section selects path timings from the timing data based on the selected larger power addition values and outputs the demodulation timing data indicative of the path timings to the frequency offset estimating section.

In this case, the search section may include a synchronizing circuit and a path search section. The synchronizing circuit calculates the correlation values from the received spectrum spread signal to output to the frequency offset estimating section, and calculates the power values as in-phase addition values of the symbols corresponding to the correlation values while correcting phases of the symbols based on the frequency offsets. The path search section calculates the power addition values of the power values, and selects larger ones of the power addition values to output together with the timing data corresponding to the selected larger power addition values. In this case, the synchronizing circuit may include a signal converting section, a sampling and holding circuit, a correlating unit and a symbol integrating unit. The signal converting section converts the received spectrum spread signal into a baseband signal. The sampling and holding circuit samples and holds the baseband signal to output a sampling signal. The correlating unit calculates the correlation values from the sampling signal. The symbol integrating unit inversely modulates the symbols with predetermined data and calculates the power values as the in-phase addition values of the symbols values while correcting phases of the symbols based on the frequency offsets.

Also, the search section may include a synchronizing circuit, a slot integrating unit and a path search section. The synchronizing circuit calculates the correlation values from the received spectrum spread signal to output to the frequency offset estimating section, and calculates the power values of the symbols. The slot integrating unit calculates the power addition values of the power values while correcting phases of the symbols based on the frequency offsets. The path search section selects larger ones of the power addition values to output together with the timing data corresponding to the selected larger power addition values. In this case, the synchronizing circuit may include a signal converting section, a sampling and holding circuit, a correlating unit and a symbol integrating unit. The signal converting section converts the received spectrum spread signal into a baseband signal. The sampling and holding circuit samples and holds the baseband signal to output a sampling signal. The correlating unit calculates the correlation values from the sampling signal. The symbol integrating unit inversely modulates the symbols with predetermined data and calculates the power values of the symbols.

In another aspect of the present invention, a method of establishing synchronization in a spectrum spread communication system, is achieved by (a) calculating correlation values from a received spectrum spread signal; by (b) calculating power values as addition values of symbols corresponding to the correlation values and power addition values of the power values, one of the symbols and the power values being corrected in phase based on frequency offsets; by (c) selecting larger ones of the power addition values to output together with timing data corresponding to the selected larger power addition values; by (d) estimating the frequency offsets from one of the correlation values and the power values and demodulation timing data; and by (e) selecting path timings from the timing data based on the selected larger power addition values such that the demodulation timing data indicative of the path timings are produced.

In this case, when the (d) estimating is attained by estimating the frequency offsets from the correlation values and demodulation timing data, the (b) calculating may be attained by adding the symbols corresponding to the correlation values while correcting phases of the symbols based on the frequency offsets, to produce the power values; and by adding the power values to produce the power addition values.

Also, when the (d) estimating is attained estimating the frequency offsets from the power values and demodulation timing data, the (b) calculating may be attained by adding the symbols corresponding to the correlation values to produce the power values; and by adding the power values while correcting phases of the power values based on the frequency offsets, to produce the power addition values.

In order to achieve still another aspect of the present invention, a receiver in a spectrum spread communication system, includes m (m is an integer larger than 1) search section, a frequency offset estimating section, and a demodulation path selecting section. Each of the m search section calculates correlation values from a received spectrum spread signal, calculates power values as addition values of symbols corresponding to the correlation values while correcting phases of the symbols based on frequency offsets, calculates power addition values of the power values, and selects larger ones of the power addition values to output together with timing data corresponding to the selected larger power addition values. The frequency offset estimating section estimates the frequency offsets from the correlation values for a corresponding one of the m search sections and demodulation timing data to output to the corresponding search section. The demodulation path selecting section selects path timings from the timing data based on the selected larger power addition values for each of the m search sections and outputs the demodulation timing data indicative of the path timings to the frequency offset estimating section corresponding to the search section.

In this case, each of the m search sections may include a synchronizing circuit, and a path search section. The synchronizing circuit calculates the correlation values from the received spectrum spread signal to output to the frequency offset estimating section, and calculates the power values as in-phase addition values of the symbols corresponding to the correlation values while correcting phases of the symbols based on the frequency offsets. The path search section calculates the power addition values of the power values, and selects larger ones of the power addition values to output together with the timing data corresponding to the selected larger power addition values. In this case, the synchronizing circuit may include a signal converting section, a sampling and holding circuit, a correlating unit and a symbol integrating unit. The signal converting section converts the received spectrum spread signal into a baseband signal. The sampling and holding circuit samples and holds the baseband signal to output a sampling signal. The correlating unit calculates the correlation values from the sampling signal. The symbol integrating unit inversely modulates the symbols with predetermined data and calculates the power values as the in-phase addition values of the symbols values while correcting phases of the symbols based on the frequency offsets.

In order to achieve yet still another aspect of the present invention, a receiver in a spectrum spread communication system, includes m (m is an integer larger than 1) search sections, a frequency offset estimating section and a demodulation path selecting section. Each of the m search sections calculates correlation values from a received spectrum spread signal, calculates power values as addition values of symbols corresponding to the correlation values, calculates power addition values of the power values while correcting phases of the power values based on frequency offsets, and selects larger ones of the power addition values to output together with timing data corresponding to the selected larger power addition values. The frequency offset estimating section estimates the frequency offsets from the correlation values for a corresponding one of the m search sections and demodulation timing data to output to the corresponding search section. The demodulation path selecting section selects path timings from the timing data based on the selected larger power addition values for each of the m search sections and outputs the demodulation timing data indicative of the path timings to the frequency offset estimating section corresponding to the search section.

In this case, each of the m search sections may include a synchronizing circuit, a slot integrating unit and a path search section. The synchronizing circuit calculates the correlation values from the received spectrum spread signal to output to the frequency offset estimating section, calculates the power values of the symbols. The slot integrating unit calculates the power addition values of the power values while correcting phases of the power values based on the frequency offsets. The path search section selects larger ones of the power addition values to output together with the timing data corresponding to the selected larger power addition values. In this case, the synchronizing circuit may include a signal converting section, a sampling and holding circuit, a correlating unit and a symbol integrating unit. The signal converting section converts the received spectrum spread signal into a baseband signal. The sampling and holding circuit samples and holds the baseband signal to output a sampling signal. The correlating unit calculates the correlation values from the sampling signal. The symbol integrating unit inversely modulates the symbols with predetermined data and calculates the power values of the symbols.

DESCRIPTION OF THE PREFERRED EMBODIMENTS

Hereinafter, a synchronization establishing apparatus in a spectrum spread communication system will be described below in detail with reference with the attached drawings.

Figure 2:
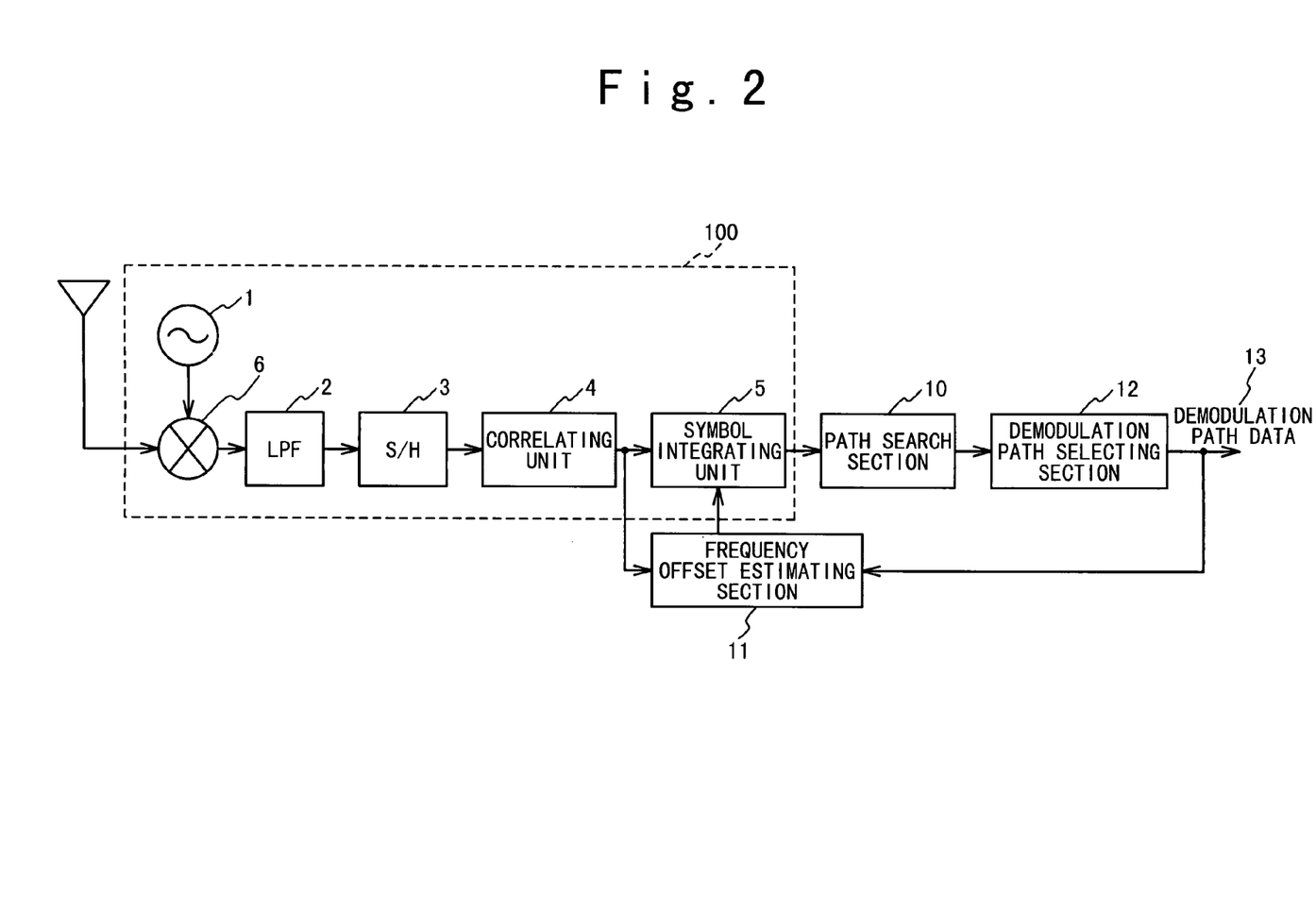
FIG. 2 is a block diagram showing the structure of a spectrum spread communication synchronization establishing circuit according to a first embodiment of the present invention.

FIG. 2 is a block diagram showing the structure of the synchronization establishing apparatus according to the first embodiment of the present invention. Referring to FIG. 2, the synchronization establishing apparatus in the first embodiment is composed of a synchronizing circuit 100, a path search section 10, a frequency offset estimating section 11, a demodulation path selecting section 12. The synchronizing circuit 100 is composed of a signal converting section of a local oscillator 1, a multiplier and a low pass filter (LPF) 2, a sampling and holding circuit (S/H) 3, a correlating unit 4 and a symbol integrating unit 5.

The signal converting section converts a received signal from an antenna into a baseband signal to output to the sampling and holding circuit 3. The sampling and holding circuit (S/H) 3 samples the baseband signal to store and hold it and outputs a sampling signal to the correlating unit 4. The correlating unit 4 calculates correlation between the sampling signal and a spreading signal corresponding to a spreading code to acquire correlation values. The symbol integrating unit 5 inversely modulates the correlation values. That is, the symbol integrating unit 5 multiplies each of the correlation values by a theoretical value of a symbol corresponding to the correlation value in case that the symbol is known or a determination value after demodulation in case that the symbol is unknown. Then, the symbol integrating unit 5 sums the multiplication results for a plurality of symbols, and calculates a power of the summation result to acquire a power value. In the present invention, when the summing operation is carried out for the plurality of symbols in the symbol integrating unit 5, the summing operation is carried out to produce the power value while correcting the multiplication results for the phase change quantities.

The path search section 10 adds the power values for a plurality of slots to produce a power addition value, and selects larger ones of the power addition values in order to outputs to the demodulation path selecting section together with timing data indicative of timings corresponding to the selected power addition values.

The demodulation path selecting section 12 selects demodulation reception timing data from the timing data outputted from the path search sections 10 based on the selected larger power addition values.

The frequency offset estimating section 11 selects effective paths from the correlation values outputted from the correlating unit 12 using the demodulation path timing data outputted from the demodulation path selecting section 12 and estimates the frequency offset. Thus, the frequency offset estimating section 11 calculates the phase change quantities from the frequency offsets to output to the symbol integrating unit 5

Next, referring now to FIG. 2, the operation of the present invention will be described. The spectrum spread signal received by the antenna is converted to the baseband signal at the local oscillator 1, the multiplier 6 and the low path filter (LPF) 2. Then, the baseband signal is sampled for every 1/Nc chips by the sampling and holding circuit (S/H) 3 and supplied to the correlating unit 4 via a memory. The value of Nc preferably is 2 or 4.

The correlating unit 4 is composed of a matched filter. The correlating unit 4 multiplies the spreading code for one symbol of the signal read out from the memory by the preset spreading code for one symbol for every chip and outputs a summation of the multiplication results as a correlation value. This operation is carried out at a plurality of sample points or a plurality of paths which are shifted in order by 1/Nc chip, and the respective correlation values are outputted. Therefore, the respective correlation values corresponding to the plurality of paths are outputted from the correlating unit 4.

It should be noted that the correlation values for all the paths are outputted in a time divisional manner by the correlating unit 4 in FIG. 2. A plurality of correlating units 4 may be provided for the number of expected paths and each of the correlating units 4 may calculate correlation between the spreading code for one symbol of the signal read out from the memory and the preset spreading code for one symbol shifted by 1/Nc chip and output the correlation value for the path.

In the symbol integrating unit 5, a symbol signal obtained by a despreading operation in the interval of 1/Nc chip or the correlation value for each path is multiplied by a theoretical value for a known symbol in case that the signal is the known signal such as a pilot symbol in a transmission sequence and a determination value determined after modulation in case that the signal is unknown. Then, the symbol integrating unit 5 corrects the phases of the multiplied symbols based on the phase rotation quantities for the frequency offsets supplied from the frequency offset estimating section 11, and adds the multiplication results for a plurality of symbols for every path.

Because the phases of the symbols to be in-phase added are aligned by correcting the inversely modulated symbol phases, gains of the in-phase addition can be utilized. However, the symbol integrating unit 5 uses all or part of the symbols contained in the slot. The power value of the integrated addition value is found and outputted to the path search section 10.

The path search section 10 adds the power values supplied from the symbol integrating unit 5 for a plurality of slots. Then, the path search section selects several larger power values in order and outputs to the demodulation path selecting section 12 together with the corresponding timing data.

The demodulation path selecting section 12 selects several path timings based on the power addition values and the timing data supplied from the pas search section 10, and outputs the demodulation path timing data for the selected path timings to a demodulation unit (not shown) to be connected to the outside of the demodulation path selecting section 12.

As methods for selecting the path in the demodulation path selecting section 12, there are a method for allocating demodulation paths in order of larger average power per one slot from all the timings, a method for weighting the power addition value of each path in accordance with the signal to interference ratio (SIR) of the path and allocating the demodulation paths in order of larger weighted power addition values, and a method for selecting the path in consideration of past changes of the power addition values of each path, as described in the above disclosure. In either of the methods, any one of the paths is selected when the path timings are close to each other.

The frequency offset estimating section 11 selects effective demodulation path symbols from the correlation values supplied from the correlating unit 4 based on the demodulation path timing data outputted from the demodulation path selecting section 12 and estimates the frequency offsets. For the frequency offset estimating method, for example, a frequency offset estimating method by delay detection or a frequency offset estimating method by FFT (Fast Fourier Transform) is used. The frequency offset estimating method using FFT is described in Japanese Laid Open Patent Application (JP-A-Heisei 11-88229). When any of these frequency offset estimating methods is used, the frequency offset estimating section 11 calculates the phase change quantity based on the frequency offset estimation value to output the data to the symbol integrating unit 5.

Figure 3:
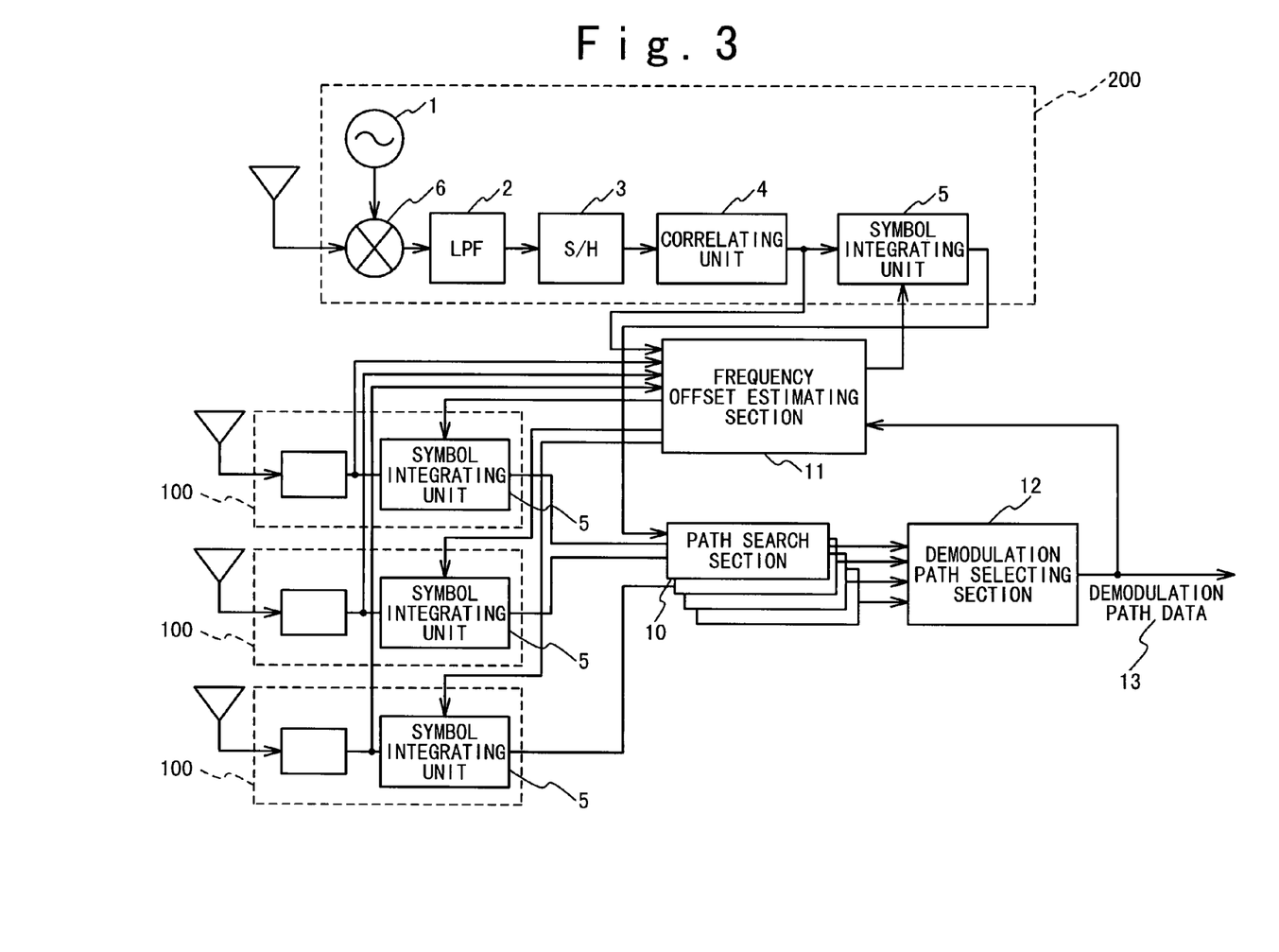
FIG. 3 is a block diagram showing the structure of the spectrum spread communication synchronization establishing circuit according to a second embodiment of the present invention.

FIG. 3 is a block diagram showing the spectrum spread communication synchronization establishing circuit according to the second embodiment of the present invention. The spectrum spread communication synchronization establishing circuit is composed of a plurality of synchronizing circuits 200 a plurality of path search sections 10, a frequency offset estimating section 11 and a demodulation path selecting section 12. Thus, the spectrum spread communication synchronization establishing circuit has the configuration to enable space diversity reception.

Each of the plurality of synchronizing circuits 200 is composed of a signal converting section of a local oscillator 1, a multiplier 6 and a low pass filter (LPF) 2, a sampling and holding circuit (S/H) 3, a correlating unit 4, and a symbol integrating unit 5 in the first embodiment. The basic synchronization establishing operation by the synchronizing circuit 200 in the second embodiment is same as that of the synchronizing circuit 100 in the first embodiment. Therefore, detailed description of the structure and operation will be omitted.

The demodulation path selecting section 12 in the second embodiment selects several path timings based on the power addition values and the timing data supplied from the path search section 10 for each antenna, and outputs the demodulation path timing data for the selected path timings and antenna data to a demodulation unit (not shown) to be connected to the outside of the demodulation path selecting section 12. If their path timings are close to one another for the path obtained from the same antenna, any one of the paths is selected.

Figure 4:
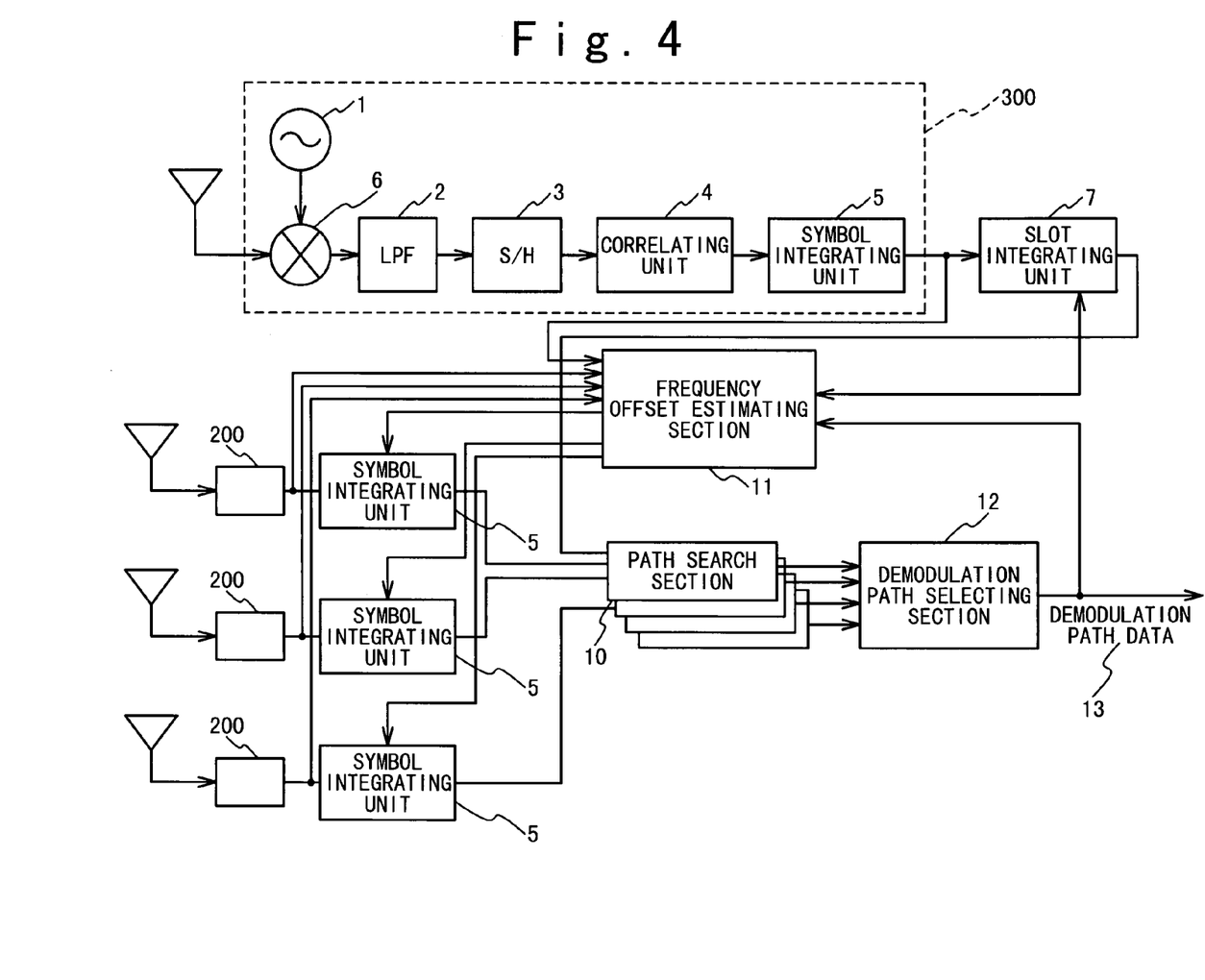
FIG. 4 is a block diagram showing the structure of the spectrum spread communication synchronization establishing circuit according to a third embodiment of the present invention.

FIG. 4 is a block diagram showing the spectrum spread communication synchronization establishing circuit according to the third embodiment of the present invention. In this embodiment, like the above embodiments, the spectrum spread communication synchronization establishing apparatus is composed of a plurality of synchronizing circuits 300, a plurality of slot integrating units 7, a plurality of path search sections 10, a frequency offset estimating section 11, and a demodulation path selecting section 12.

Each of the plurality of synchronizing circuits 300 is composed of a signal converting section of a local oscillator 1, a multiplier 6 and a low pas filter (LPF) 2, a sampling and holding circuit (S/H) 3, a correlating unit 4, and a symbol integrating unit 5. The signal converting section converts a received signal from an antennal into a baseband signal. The sampling and holding circuit (S/H) 3 samples the baseband signal to store and hold it and outputs as a sampling signal. The correlating unit 4 calculates correlation between the sampling signal and a spreading signal corresponding to the spreading code to acquire a correlation value. The symbol integrating unit 5 carries out inverse modulation to the correlation value. That is, the symbol integrating unit 5 multiplies the correlation value by a theoretical value of a symbol corresponding to the correlation value in case that the symbol is known or a determination value after demodulation in case that the symbol is unknown symbol. Then, the symbol integrating unit 5 adds and outputs the multiplication results for a plurality of symbols.

One of the slot integrating units 7 corresponding to the above synchronizing circuit 300 calculates a power value of the addition result while correcting phase rotations corresponding to the frequency offsets.

One of the plurality of path search sections 10 corresponding to the above slot integrating unit 7 adds the power values for a plurality of slots to produce a power addition value, and selects larger ones of the power addition values in order to output the selected power addition values and timing data indicative of timings corresponding to the selected power addition values.

The demodulation path selecting section 12 selects demodulation reception timings from the timing data outputted from the path search sections 10 based on the selected larger power addition values and outputs demodulation path timing data.

The frequency offset estimating section 11 selects effective paths from the adding results supplied from the symbol integrating units 5 correlating unit 12 using the demodulation path timing data outputted from the demodulation path selecting section 12 and estimate the frequency offsets. The frequency offsets are supplied to the slot integrating units 7 for the synchronizing circuits 300.

Referring now FIG. 4, the description will be made on the operation. The operations of the signal converting section, the sampling and holding circuit 3 and the correlating unit 4 of the synchronizing circuit 300 in the third embodiment are same as those of the synchronizing circuit 100 in the first embodiment. Therefore, the description will be omitted.

The symbol integrating unit 5 of the synchronizing circuit 300 carries out inverse modulation. That is, the symbol integrating unit 5 multiplies a symbol signal obtained by despreading in the 1/Nc chip interval by a theoretical value for the known symbol in case that the symbol signal is known in the transmission sequence as a pilot symbol signal and by a determination value after demodulation in case that the symbol is unknown. Then, the symbol integrating unit 5 adds the inverse modulation results for a plurality of symbols and outputs the addition result to the slot integrating unit 7. In this case, however, the symbol integrating unit uses all or part of the symbols contained in the slot.

The slot integrating unit 7 corrects the phase of the addition value supplied from the symbol integrating unit 6 based on the phase rotation quantities by the frequency offsets supplied from the frequency offset estimating section 11. At the same time, or after that, the slot integrating unit 7 calculates the power value for the addition value, and outputs to the path search section 10. The respective symbol phases to be in-phase added are aligned by correcting the inversely modulated symbol phases, so that gains by the in-phase addition can be effectively utilized.

The path search section 10 adds the power values supplied from the corresponding slot integrating unit 7 for a plurality of slots. Then, the path search section 10 selects several larger ones of the power addition values in order and outputs to the demodulation path selecting section 12 together with the corresponding timing data.

The demodulation path selecting section 12 selects several path timings based on the selected power addition values and the timing data supplied from the pas search section 10 for each antenna, and outputs the demodulation path timing data indicative of the selected path timings and antenna data for the path to a demodulation unit (not shown) to be connected to the outside of the demodulation path selecting section 12. The method for selecting the path in the demodulation path selecting section 12 is the same as that of the second embodiment.

The frequency offset estimating section 11 selects the addition values for effective demodulation paths from the addition values supplied from the symbol integrating units 5 based on the demodulation path timing data outputted from the demodulation path selecting section 12 and estimates the frequency offsets based on the selected addition values. The frequency offset estimating method is the same as that of the second embodiment. The frequency offset estimating section 11 calculates the phase change quantities based on the estimated frequency offsets and gives the result to the slot integrating unit 7. It should be noted that in the third embodiment, the configuration with only one set of the antenna, the synchronizing circuit 200, and the slot integrating unit 7 is allowable.

According to the present invention, even in the environment where there is in addition to noises, frequency offsets generated in the transmission path due to the Doppler effect or a frequency offset for which the frequency error of the oscillator between the relevant receiver and the transmitter cannot be removed by the demodulator, it is possible to set a larger number of symbols to be in-phase added than the conventional example, since the in-phase addition is carried out using the phase corrected correlation values or addition result. Consequently, it is possible to utilize the gains obtained through the in-phase addition and to provide stable synchronization establishment to the spectrum spread communication demodulation apparatus to be connected to the outside.

What is claimed is:

1. A synchronization establishing apparatus in a spectrum spread communication system, comprising:

a search section which calculates correlation values from a received spectrum spread signal, calculates power values as addition values of symbols corresponding to said correlation values and power addition values of said power values, and selects larger ones of said power addition values to output together with timing data corresponding to said selected larger ones of said power addition values;

a frequency offset estimating section which estimates frequency offsets from said power values and demodulation timing data, and calculates phase change quantities from the estimated frequency offsets to output to said search section; and a demodulation path selecting section which selects path timings from said timing data based on said selected larger ones of said power addition values and outputs said demodulation timing data indicative of said path timings to said frequency offset estimating section, wherein during the calculation of said power values, said search section corrects phases of either said symbols or said power values based on said phase change quantities calculated by said frequency offset estimating section.

2. The synchronization establishing apparatus according to claim 1, wherein said search section comprises:

a synchronizing circuit which calculates said correlation values from said received spectrum spread signal, and calculates said power values as in-phase addition values of said symbols corresponding to said correlation values while correcting phases of either said symbols or said power values based on said phase change quantities; and a path search section which calculates said power addition values of said power values, and selects larger ones of said power addition values to output together with said timing data corresponding to said selected larger ones of said power addition values.

3. The synchronization establishing apparatus according to claim 2, wherein said synchronizing circuit comprises:

a signal converting section which converts said received spectrum spread signal into a baseband signal;

a sampling and holding circuit which samples and holds said baseband signal to output a sampling signal;

a correlation unit which calculates said correlation values from said sampling signal; and a symbol integrating unit which inversely modulates said symbols with predetermined data and calculates said power values as said in-phase addition values of said symbols values while correcting phases of said symbols based on said phase change quantities.

4. The synchronization establishing apparatus according to claim 1, wherein said search section comprises:

a synchronizing circuit which calculates said correlation values from said received spectrum spread signal, and calculates said power values of said symbols;

a slot integrating unit which calculates said power addition values of said power values while correcting phases of said power values based on said phase change quantities; and a path search section which selects larger ones of said power addition values to output together with said timing data corresponding to said selected larger power addition values.

5. The synchronization establishing apparatus according to claim 4, wherein said synchronizing circuit comprises:

a signal converting section which converts said received spectrum spread signal into a baseband signal;

a sampling and holding circuit which samples and holds said baseband signal to output a sampling signal;

a correlation unit which calculates said correlation values from said sampling signal; and a symbol integrating unit which inversely modulates said symbols with predetermined data and calculates said power values of said symbols.

6. A method of establishing synchronization in a spectrum spread communication system, comprising:

(a) calculating correlation values from a received spectrum spread signal;

(b) calculating power values as addition values of symbols corresponding to said correlation values and power addition values of said power values;

(c) selecting larger ones of said power addition values to output together with timing data corresponding to said selected larger ones of said power addition values;

(d) estimating frequency offsets from said power values and demodulation timing data to produce phase change quantities from the estimated frequency offsets; and (e) selecting path timings from said timing data based on said selected larger ones of said power addition values such that said demodulation timing data indicative of said path timings are produced, wherein the calculating step (b) further comprises correcting phases of either said symbols or said power values based on said phase change quantities produced in the estimating step (d).

7. The method according to claim 6, wherein said (d) estimating includes:

estimating said frequency offsets from said correlation values and demodulation timing data to produce said phase change quantities from the estimated frequency offsets, said (b) calculating includes:

adding said symbols corresponding to said correlation values while correcting phases of said symbols based on said phase change quantities, to produce said power values; and adding said power values to produce said power addition values.

8. The method according to claim 6, wherein said (d) estimating includes:

estimating said frequency offsets from said power values and demodulation timing data to produce said phase change quantities from the estimated frequency offsets, said (b) calculating includes:

adding said symbols corresponding to said correlation values to produce said power values; and adding said power values while correcting phases of said power values based on said phase change quantities, to produce said power addition values.

9. A receiver in a spectrum spread communication system, comprising:

m (m is an integer larger than 1) search sections, each of which calculates correlation values from a received spectrum spread signal, calculates power values as addition values of symbols corresponding to said correlation values while correcting phases of either said symbols or said power values based on phase change quantities, calculates power addition values of said power values, and selects larger ones of said power addition values to output together with timing data corresponding to said selected larger ones of said power addition values;

a frequency offset estimating section which estimates frequency offsets from said power values for a corresponding one of said m search sections and demodulation timing data, and calculates said phase change quantities from the estimated frequency offsets to output to said corresponding search section; and a demodulation path selecting section which selects path timings from said timing data based on said selected larger power addition values for each of said m search sections and outputs said demodulation timing data indicative of said path timings to said frequency offset estimating section corresponding to said search section.

10. The receiver according to claim 9, wherein each of said m search sections comprises:

a synchronizing circuit which calculates said correlation values from said received spectrum spread signal, and calculates said power values as in-phase addition values of said symbols corresponding to said correlation values while correcting phases of either said symbols or said power values based on said phase change quantities; and a path search section which calculates said power addition values of said power values, and selects larger ones of said power addition values to output together with said timing data corresponding to said selected larger power addition values.

11. The receiver according to claim 10, wherein said synchronizing circuit comprises:

a signal converting section which converts said received spectrum spread signal into a baseband signal;

a sampling and holding circuit which samples and holds said baseband signal to output a sampling signal;

a correlation unit which calculates said correlation values from said sampling signal; and a symbol integrating unit which inversely modulates said symbols with predetermined data and calculates said power values as said in-phase addition values of said symbols values while correcting phases of said symbols based on said phase change quantities.

12. A receiver in a spectrum spread communication system, comprising:

m (m is an integer larger than 1) search sections, each of which calculates correlation values from a received spectrum spread signal, calculates power values as addition values of symbols corresponding to said correlation values, calculates power addition values of said power values while correcting phases of said power values based on phase change quantities, and selects larger ones of said power addition values to output together with timing data corresponding to said selected larger ones of said power addition values;

a frequency offset estimating section which estimates frequency offsets from said power values for a corresponding one of said m search sections and demodulation timing data, and calculates said phase change quantities from the estimated frequency offsets to output to said corresponding search section; and a demodulation path selecting section which selects path timings from said timing data based on said selected larger power addition values for each of said m search sections and outputs said demodulation timing data indicative of said path timings to said frequency offset estimating section corresponding to said search section.

13. The receiver according to claim 12, wherein each of said m search sections comprises:

a synchronizing circuit which calculates said correlation values from said received spectrum spread signal, calculates said power values of said symbols;

a slot integrating unit which calculates said power addition values of said power values while correcting phases of said power values based on said phase change quantities; and a path search section which selects larger ones of said power addition values to output together with said timing data corresponding to said selected larger ones of said power addition values.

14. The receiver according to claim 13, wherein said synchronizing circuit comprises:

a signal converting section which converts said received spectrum spread signal into a baseband signal;

a sampling and holding circuit which samples and holds said baseband signal to output a sampling signal;

a correlation unit which calculates said correlation values from said sampling signal; and a symbol integrating unit which inversely modulates said symbols with predetermined data and calculates said power values as said in-phase addition values of said symbols.

15. A synchronization establishing apparatus in a spectrum spread communication system, comprising:

a search section which calculates correlation values from a received spectrum spread signal, calculates power values as addition values of symbols corresponding to said correlation values and power addition values of said power values, and selects larger ones of said power addition values to output together with timing data corresponding to said selected larger power addition values;

a frequency offset estimating section which estimates frequency offsets from said power values and demodulation timing data, and calculates said phase change quantities from the estimated frequency offsets to output to said search section; and a demodulation path selecting section which selects path timings from said timing data based on said selected larger ones of said power addition values and outputs said demodulation timing data indicative of said path timings to said frequency offset estimating sections, wherein during the calculation of said power values, said search section corrects phases of either said symbols or said power values based on said phase change quantities calculated by said frequency offset estimating section, and wherein said frequency offset estimating section performs frequency offset estimation by delay detection or by fast fourier transform (FFT) estimation.

16. A synchronization establishing apparatus in a spectrum spread communication system, comprising:

a search section which calculates correlation values from a received spectrum spread signal, calculates power values as addition values of symbols corresponding to said correlation values and power addition values of said power values, and selects larger ones of said power addition values to output together with timing data corresponding to said selected larger ones of said power addition values;

a frequency offset estimating section which estimates frequency offsets from said power values and demodulation timing data, and calculates phase change quantities from the estimated frequency offsets to output to said search section; and a demodulation path selecting section which selects path timings from said demodulation timing data based on said selected larger ones of said power addition values and outputs said demodulation timing data indicative of said path timings to said frequency offset estimating section, wherein during the calculation of said power values, said search section corrects phases of either said symbols or said power values based on said phase change quantities calculated by said frequency offset estimating section, and wherein said search section comprises:

a synchronizing circuit which calculates said correlation values from said received spectrum spread signal, and calculates said power values as in-phase addition values of said symbols corresponding to said correlation values while correcting phases of either said symbols or said power values based on said phase change quantities; and a path search section which calculates said power addition values of said power values, and selects larger ones of said power addition values to output together with said timing data corresponding to said selected larger ones of said power addition values, wherein said synchronizing circuit comprises:

a signal converting section which converts said received spectrum spread signal into a baseband signal;

a sampling and holding circuit which samples and holds said baseband signal to output a sampling signal;

a correlation unit which calculates said correlation values from said sampling signal; and a symbol integrating unit which receives said correlation values output by said correlation unit, and which inversely modulates said symbols with predetermined data and calculates said power values as said in-phase addition values of said symbols values while correcting phases of either said symbols or said power values based on said phase change quantities provided to said symbol integrating unit by said frequency offset estimating section.

* * * * *